United States Patent
Sato et al.

[11] Patent Number: 5,877,935
[45] Date of Patent: Mar. 2, 1999

[54] ACTIVE CARBON USED FOR ELECTRODE FOR ORGANIC SOLVENT TYPE ELECTRIC DOUBLE LAYER CAPACITOR

[75] Inventors: Kenji Sato; Minoru Noguchi; Naohiko Oki; Shigeki Oyama, all of Wako, Japan

[73] Assignee: Honda Giken Kogyo Kabushiki-Kaisha, Tokyo, Japan

[21] Appl. No.: 931,410

[22] Filed: Sep. 16, 1997

[30] Foreign Application Priority Data

Sep. 17, 1996 [JP] Japan ................................. 8-265096

[51] Int. Cl.$^6$ ....................................................... H01G 9/00
[52] U.S. Cl. .......................... 361/502; 361/503; 423/414; 423/445 R; 502/418
[58] Field of Search .......................... 29/25.03; 502/416, 502/400, 402, 401, 430, 432, 417, 184, 418, 427, 437; 423/445 R, 414; 264/13, 112, 117; 427/79, 80, 488, 52; 429/218, 122, 38, 194; 361/303, 305, 508, 502, 503, 532

[56] References Cited

U.S. PATENT DOCUMENTS

| | | | |
|---|---|---|---|
| 4,578,327 | 3/1986 | Saito et aL. .............................. | 429/194 |
| 4,777,083 | 10/1988 | Ono et al. ................................. | 428/218 |
| 4,818,640 | 4/1989 | Fukuda et al. ............................ | 429/38 |
| 5,587,255 | 12/1996 | Sonobe et al. ............................ | 429/218 |
| 5,711,988 | 1/1998 | Tsai et al. .................................. | 427/80 |
| 5,744,421 | 4/1998 | Robinson et al. ....................... | 502/416 |

FOREIGN PATENT DOCUMENTS 7-302735 A 11/1995 Japan.
09275042 10/1997 Japan.

OTHER PUBLICATIONS

"Evaluation of Activated Carbon Electrodes for Electric Double Layer Capacitors Using an Organic Electrolyte Solution", Hiratsuka et al, *Electrochemistry,* vol. 59, No. 7, 1991, pp. 607–613.

*Primary Examiner*—Kristine Kincaid
*Assistant Examiner*—Anthony Dinkins
*Attorney, Agent, or Firm*—Nikaido Marmelstein Murray & Oram LLP

[57] ABSTRACT

An active carbon suitable for use in electrodes for an organic solvent type electric double layer capacitor, which is obtained by calcining an easily graphitizable organic substance and then activating the resultant carbonized product with an alkali, wherein a mode in the pore size distribution of the active carbon according to a transmission electron microscope (TEM) image analysis method falls within a range of 10–20 angstroms, and an conjunctive pore rate, which is expressed by a proportion of the total area of pores having an area not smaller than 500 square angstroms to the whole pore area in the TEM image, is at least 20%.

9 Claims, 3 Drawing Sheets

ACTIVE CARBON USED FOR ELECTRODE FOR ORGANIC SOLVENT TYPE ELECTRIC DOUBLE LAYER CAPACITOR

BACKGROUND OF THE INVENTION

1. Field of the Invention

The present invention relates to active carbon suitable for use in polarizable electrodes for an electric double layer capacitor making use of an electrolytic organic solvent solution.

2. Description of the Background Art

Since an electric double layer capacitor has a large capacity of the farad level and is also excellent in charge and discharge cycle properties, it is used in applications such as back up power supplies for electronic equipment and batteries for automobiles.

In this electric double layer capacitor, for example, as illustrated in FIG. 4, a pair of polarizable electrodes 1, 1 composed of active carbon are arranged in an opposed relation to each other through a separator 2, and the polarizable electrodes 1, 1 are impregnated with an organic solvent solution of a tetraalkylammonium salt or the like as an electrolytic solution so as to function as positive and negative electrodes, respectively. In the electric double layer capacitor illustrated in FIG. 4, the polarizable electrodes 1, 1 opposed to each other through the separator 2 are contained in an aluminum container 3 which is closed with an aluminum lid 5 through a packing 4. In the above-described construction, the container 3 and the lid 5 come into separate contact with the polarizable electrodes 1, 1 in such a manner that the container 3 serves as a current collector member on the cathode side to the polarizable electrode 1, and the lid 5 serves as a current collector member on the anode side to the other polarizable electrode 1.

Although active carbon having fine pores is used for the polarizable electrodes for such an electric double layer capacitor, there is a demand for development of active carbon capable of more heightening the capacity density of the polarizable electrodes for the purpose of providing a smaller and lighter electric double layer capacitor having a greater capacity.

Therefore, various properties of active carbon have been investigated with a view toward providing active carbon capable of heightening the capacity density of the polarizable electrodes. For example, the hypothesis that "A capacity density per weight of active carbon in an electrode has an almost linear proportional relationship with a specific surface area of the active carbon, and the capacity of an electric double layer on the active carbon electrode is about constant without being affected by the kind of carbon and pore characteristics thereof" has been proposed (Electrochemistry, 59, No. 7, pp. 607–613, 1991).

For example, Japanese Patent Application Laid-Open No. 302735/1995 describes active carbon the capacity density per weight of which has been heightened by subjecting a carbonaceous material to activation to enlarge its specific surface area on the basis of the above hypothesis. The active carbon described in the publication is such that the carbonaceous material is subjected to the activation, thereby forming pores suitable for adsorption of the electrolytic solution ions.

However, the active carbon described in the publication involves a disadvantage that its capacity density per volume is lowered when the activation is conducted until the capacity is developed.

In order to solve the above disadvantage, the present inventors attempted to investigate the above hypothesis. The investigation by the present inventors revealed that when a theoretical value of the capacity of an electric double layer capacitor comprising polarizable electrodes making use of such active carbon is found from a value observed by a mercury electrode or the like as the capacity of the electric double layer of the active carbon and a specific surface area of the active carbon, the theoretical value may not consist with the found value of the capacity of the electric double layer capacitor in some cases.

For example, assuming that the capacity of the electric double layer capacitor so constructed that a pair of polarizable electrodes 1, 1 are arranged with a separator 2 held therebetween as illustrated in FIG. 4 is $C_0$, and capacities of the polarizable electrodes 1, 1 are $C_1$ and $C_2$, the following equation is satisfied:

$$1/C_0 = 1/C_1 + 1/C_2 \tag{1}$$

Here, the capacity of the electric double layer of the active carbon observed by the mercury electrode is about 20 $\mu F/cm^2$. Therefore, the capacity of the electric double layer of active carbon having a specific surface area of 1,500 $m^2/cc$ amounts to:

$$20 \ (\mu F/cm^2) \times 1,500 \ (m^2/cc) = 300 \ (F/cc)$$

Then, 300 (F/cc) is substituted for $C_1$ and $C_2$ in the equation (1) to find $C_0$. As a result, $C_0$ amounts to 150 (F/cc). Since $C_0$ is a capacity for two volumes of the polarizable electrode 1, the theoretical capacity of the electric double layer capacitor should amount to 75 F/cc obtained by dividing the $C_0$ value by 2.

In reality, the capacity of the electric double layer capacitor amounts to only about 13 F/cc. Even when different kinds of active carbon having the same specific surface area are used, the capacities of the resultant electric double layer capacitors may be entirely different from each other in some cases.

Then, the present inventors paid attention to the fact that the above hypothesis is based on the specific surface area measured by nitrogen gas absorption in accordance with the BET method, and attempted a special image analysis capable of analyzing even fine pores smaller than the limit by the BET method by using an image through a transmission electron microscope, thereby investigating the relationship between capacity density and specific surface area as to various kinds of active carbon for electrodes different in specific surface area. As a result, the conclusion that there is no linear proportional relationship between them, and so factors affecting the capacity exist in some others was reached.

The present inventors carried out a further investigation on the basis of this finding. As a result, it was found that in the above electrolytic solution, the organic solvent is solvated with ions of an electrolyte such as the tetraalkylammonium salt or the like to form electrolytic solution ions, and so many pores having a pore size suitable for adsorption of the electrolytic solution ions are formed in active carbon, thereby providing active carbon excellent in capacity density per volume.

Based on this finding, the reason why in the active carbon described in Japanese Patent Application Laid-Open No. 302735/1995, the capacity density per volume is lowered when the activation is performed until the capacity is developed is considered. The active carbon is such that the carbonaceous material is subjected to the activation, thereby forming pores suitable for adsorption of the electrolytic solution ions. However, it is considered that the pore size distribution of pores formed by such activation widely ranges from a small size to a large size. As a result, it is considered that the number of pores having a pore size suitable for the adsorption of the electrolytic solution ions relatively decreases in such active carbon, in other words, the number of pores noncontributory to capacity increases, so that a sufficient capacity density per volume cannot be obtained.

Further, the present inventors found active carbon suitable for use in electrodes for an electric double layer capacitor, in which the pore size suitable for the adsorption of the electrolytic solution ions takes a mode in its pore size distribution, on the basis of the above finding. Such active carbon was previously applied for patent (Japanese Patent Application No. 46912/1996). The active carbon described in the above specification is such that a carbonized product obtained by calcining a vinyl chloride resin is activated with an alkali at a temperature ranging from 400° to 1,000° C. The mode in its pore size distribution is within a range of 10–20 angstroms, which are pore sizes suitable for adsorption of the electrolytic solution ions. According to such active carbon, a polarizable electrode high in electrode density and capacity density per volume can be formed because the mode in its pore size distribution falls within the above range. In particular, when the alkali activation is performed for 15–20 hours at the temperature within the above range, the capacity density per volume becomes a maximum value.

Incidentally, the mode in the above specification means a value of a pore size which shows the highest relative frequency in the frequency distribution of pore sizes, which is found from a power spectrum obtained by converting the image of the active carbon through a transmission electron microscope into a binary image and subjecting this binary image to Fourier transformation.

According to such active carbon, a polarizable electrode high in capacity density per volume can be constructed, and an electric double layer capacitor high in energy density can hence be constructed by such polarizable electrodes. However, there is a demand for development of active carbon more improved.

SUMMARY OF THE INVENTION

Accordingly, it is an object of the present invention to provide more improved active carbon which is suitable for use in polarizable electrodes for an electric double layer capacitor and has a high capacity density per volume.

The above object can be achieve by the present invention described below.

According to an aspect of the present invention, there is thus provided active carbon suitable for use in electrodes for an organic solvent type electric double layer capacitor, which is obtained by calcining an easily graphitizable organic substance and then activating the resultant carbonized product with an alkali, wherein a mode in the pore size distribution of the active carbon according to a transmission electron microscope (TEM) image analysis method falls within a range of 10–20 angstroms, and an conjunctive pore rate, which is expressed by a proportion of the total area of pores having an area not smaller than 500 square angstroms to the whole pore area in the TEM image, is at least 20%.

Here, the TEM image analysis method means an analytic method that a negative image of a photograph of an object taken by a transmission electron microscope (TEM) is read in a computer by a high-resolution film scanner to provide a digital image, and the digital image is processed according to the intended purpose. According to the TEM image analysis method, even fine pores smaller than the limit of measurement by the BET method can be analyzed, and moreover even the shape of pores can be identified.

In order to determine the frequency distribution of pore sizes by the TEM image analysis method, a TEM photograph of 200,000 magnifications is converted into a digital image having an image size of 512 pixels×512 pixels at a resolution of 1,200 dpi (pixel/inch) and 256 gradation. This digital image is then subjected to two dimensional Fourier transformation as it is at 256 gradation to obtain a two dimensional power spectrum. When the two dimensional power spectrum is integrated to the whole azimuth, a one dimensional power spectrum is obtained.

The one dimensional power spectrum gives a probability of occurrence of spatial frequency as a function of the spatial frequency and may be regarded as the frequency distribution of pore sizes. Here, assuming that a spatial frequency corresponding to a peak in the distribution when recurring the one dimensional power spectrum by a Gaussian curve is $x(Å^{-1})$, the mode of the pore size is given by $1/x(Å)$.

In order to determine the conjunctive pore rate by the TEM image analysis method, the above digital image is first subjected to two dimensional Fourier transformation to cut fundamental wave, double wave and triple wave components, and then subjected to inverted Fourier transformation, thereby erasing the dispersion of densities of the TEM photograph. The image thus obtained is then converted into a binary image of a bright part (1) and a dark part (0) taking the gradation of 128 as a threshold value.

The binary image thus obtained is then analyzed by an image analyzing soft such as ultimage (trade name). In the above analysis, each pixel in the digital image is regarded as a square. If the square is a bright part, this is judged to be a pore. At this time, bright parts coming into contact with each other at sides of the squares are judged to be an open pore. However, bright parts coming into contact with each other at the vertexes of the squares are judged to be different pores. Any pore having an area smaller than 30 square angstroms is excluded because it is smaller than the resolving power of TEM, and any pore coming into contact with the periphery of the TEM image is also excluded.

When the analysis is conducted like this, one image generally includes 400–800 pores. Now, the total area (the whole pore area; S) of the pores is first found. The pores are then divided into pores having an area not smaller than 500 square angstroms and pores having an area smaller than 500 square angstroms, and the total area ($S_{500}$) of the pores having an area not smaller than 500 square angstroms is found. $S_{500}/S$ is expressed in terms of percentage and defined as the conjunctive pore rate (%).

According to the present invention, the easily graphitizable organic substance is calcined, thereby obtaining a carbonized product in which many pores having a pore size within a range suitable for the adsorption of the electrolytic solution ions have been formed in advance. Then, the carbonized product is activated with an alkali, thereby providing active carbon the mode in the pore size distribution of which falls within a range of 10–20 angstroms.

The active carbon according to the present invention can quickly adsorb ions in an electrolytic solution used in an electric double layer capacitor, with which an organic solvent has been solvated, because the mode of its pore size distribution falls within a range of 10–20 angstroms, and the capacity density per volume of the active carbon can be heightened. If the mode in the pore size distribution is smaller than 10 angstroms, the number of extremely fine pores noncontributory to the adsorption of the solvated ions is increased, so that the capacity itself becomes small. If the mode in the pore size distribution exceeds 20 angstroms on the other hand, the number of pores having a pore size larger than the pore size suitable for the adsorption of the solvated ions is increased, and a proportion that the volume of the active carbon decreases becomes higher than a proportion that the capacity increases, so that the capacity density per volume of the active carbon becomes low.

Even when the pores in the carbonized product have a pore size within a range suitable for the adsorption of the electrolytic solution ions, a bottleneck part may be formed in the interiors of the pores in many cases. Accordingly, the bottleneck part is removed by the alkali activation in order that the pores having a pore size within a range suitable for the adsorption of the electrolytic solution ions may act more effectively on the adsorption of the electrolytic solution ions. The pore from which the bottleneck part has been removed is expressed as a train of pixels having an area not smaller than 500 square angstroms in the TEM image.

In the active carbon according to the present invention, the conjunctive pore rate defined as the percentage ($S_{500}/S \times 100$) of the total area ($S_{500}$) of pores having an area not smaller than 500 square angstroms to the whole pore area (S) in the TEM image, is at least 20%, whereby the number of pores from which the bottleneck part has been removed is increased, so that the capacity density per volume of the active carbon can be heightened. If the conjunctive pore rate is lower than 20%, a bottleneck part is often formed in the interiors of the pores in the resulting active carbon even when the mode in the pore size distribution of the active carbon falls within a range suitable for the adsorption of the electrolytic solution ions. Since these pores having a bottleneck part do not effectively act on the adsorption of the electrolytic solution ions, a sufficient capacity density per volume is not provided for the active carbon.

The mode in the pore size distribution is preferably within a range of 11–15 angstroms in order for the electrolytic solution ions to be quickly adsorbed, with about 13 angstroms being most preferred.

A feature of the active carbon according to the present invention resides in that the number of pores having a mode within the above range is at least 40% of the total number of pores. If the number of pores having a mode within the above range is less than 40% of the total number of pores even when the mode in the pore size distribution of the resulting active carbon falls within a range suitable for the adsorption of the electrolytic solution ions, the number of pores noncontributory to the adsorption of the solvated ions is increased, and moreover the number of pores, in which a proportion that the volume of the active carbon decreases becomes higher than a proportion that the capacity increases, is relatively increased, so that a sufficient capacity density per volume is not provided for the active carbon.

Since the active carbon according to the present invention is obtained by activating the carbonized product itself, which has many pores having a pore size suitable for the adsorption of the electrolytic solution ions, with an alkali to remove the bottleneck parts formed within the pores as described above, it is only necessary to perform the alkali activation to such an extent that the bottleneck parts can be removed. Accordingly, a feature of the present invention resides in that a difference between a mode in the pore size distribution of the carbonized product according to the TEM image analysis method and a mode in the pore size distribution of the active carbon obtained by activating the carbonized product with an alkali according to the TEM image analysis method is within a range of 0.2–3 angstroms. If the difference in the mode between the active carbon and the carbonized product is greater than 3 angstroms, the alkali activation would result in active carbon in which not only the bottleneck parts are removed, but also the number of pores having a pore size greater than the pore size within the range suitable for the adsorption is increased. Since the active carbon according to the present invention is obtained by activating the carbonized product with an alkali, it is virtually difficult to control the difference in mode to smaller than 0.2 angstroms. In order that the alkali activation may result in active carbon in which the bottleneck parts are removed, but the number of pores having a pore size greater than the pore size within the range suitable for the adsorption of the electrolytic solution ions is reduced, it is further preferable to control the difference in mode within a range of 0.2–1.5 angstroms.

In order to control the difference in mode between the active carbon and the carbonized product to 3 angstroms or smaller, a feature of the active carbon according to the present invention resides in that the alkali activation has been performed by heating the carbonized product to a preset temperature ranging from 500° to 1,000° C. at a rate of 10°–200° C./hr. and holding it for 0–20 hours at the preset temperature.

To preset the holding time to 0 hour means that the heating is stopped momentarily at the time the temperature of the carbonized product reaches the preset temperature.

If the alkali activation is performed at a temperature lower than 500° C., it is difficult to remove the bottleneck parts. If the alkali activation is performed at a temperature exceeding 1,000° C. for a period longer than 20 hours on the other hand, the difference in mode between the active carbon and the carbonized product becomes greater than 3 angstroms.

According to the active carbon of the present invention, as described above, the alkali activation may be performed under mild conditions for a shorter period of time compared with the active carbon described in the specification of Japanese Patent Application No. 46912/1996 previously filed by the present inventors. In addition, its capacity density per volume can be made substantially the same as that of the active carbon described in the above specification.

A feature of the alkali activation resides in that the treatment is conducted with a monovalent base of an alkali metal hydroxide because the difference in mode between the active carbon and the carbonized product can be easily controlled. Examples of the alkali metal hydroxide may include lithium hydroxide, sodium hydroxide and potassium hydroxide. Of these, potassium hydroxide is preferred because it is cheap.

In order to control the difference in mode between the active carbon and the carbonized product to 3 angstroms or smaller, a feature of the alkali activation resides in that the alkali metal hydroxide is used in a range from more than 1 part by weight to not more than 4 parts by weight per 1 part by weight of the carbonized product. If the proportion of the alkali metal hydroxide per 1 part by weight of the carbonized product is not more than 1 part by weight, it is difficult to sufficiently remove the bottleneck parts. If the proportion exceeds 4 parts by weight on the other hand, the difference in mode between the active carbon and the carbonized product becomes greater than 3 angstroms. The alkali metal hydroxide is preferably used in a proportion of 1.5–3 parts by weight, more preferably 1.8–2.2 parts by weight, per 1 part by weight of the carbonized product in order to control the difference in mode between the active carbon and the carbonized product with ease.

The alkali activation may be conducted in any conventional method such as, for example, a method in which the carbonized product is mixed with the activator, and the mixture is then heated in a stream of an inert gas such as nitrogen gas or argon gas, a method in which the activator is carried on a vinyl chloride resin, which is a raw material for the carbonized product, in advance, and the raw material is then heated to conduct carbonization and activation at the same time, or a method in which the carbonized product is activated by a gas activation process making use of steam or the like, and the resultant product is then surface-treated with the activator.

The carbonized product may preferably be ground into particles having a particle size ranging from 0.1 to 300 $\mu$m before the alkali activation. When the carbonized product is ground into particles having a particle size ranging from 0.1 to 300 $\mu$m before the alkali activation, the activation in the interiors of the particles can be evenly performed. If the particle size of the carbonized product is smaller than 0.1 $\mu$m, there is a possibility that when a polarizable electrode for an electric double layer capacitor is formed from the resulting active carbon, the self-discharge resistance thereof may be deteriorated. If the particle size exceeds 300 $\mu$m, there is a possibility that the activation in the interiors of such particles may be difficult to be evenly advanced. The carbonized product may preferably be ground into particles having a particle size ranging from 1 to 100 $\mu$m for the purpose of more evenly performing the activation in the interiors of the particles.

The easily graphitizable organic substance used in the present invention generally designates an organic compound from which a graphite structure is easily formed by a calcination treatment at a relatively low temperature, for example, about 800° C. or lower. Examples thereof may include aliphatic high-molecular compounds such as vinyl chloride resins and polyacrylonitrile; and besides aromatic high-molecular compounds such as tar, mesophase pitch and polyimide. However, the vinyl chloride resins are preferred from the viewpoint of production cost. The formation of the graphite structure can be confirmed by, for example, its X-ray diffraction pattern in which 2 $\theta$ has a clear peak at about 25°.

The active carbon according to the present invention is mixed with a conductive material such as furnace black, a binder such as polytetrafluoroethylene, and the like to mold it. The molded article thus obtained is used as a polarizable electrode 1 for an organic solvent type electric double layer capacitor illustrated in FIG. 4.

Examples of an electrolyte impregnated into the polarizable electrode 1 may include the tetraalkylammonium salts of perchloric acid, phosphoric hexafluoride, boric tetrafluoride, trifluoroalkylsulfonic acids and tetrafluoromethanesulfonic acid, and the dialkylamine salts of perchloric acid, phosphoric hexafluoride, boric tetrafluoride, trifluoroalkylsulfonic acids and tetrafluoromethanesulfonic acid. Examples of an organic solvent dissolving the electrolyte therein may include propylene carbonate, butylene carbonate, $\gamma$-butyrolactone, acetonitrile, dimethylformamide, 1,2-dimethoxyethane, sulfolane and nitroethane. The electrolyte is dissolved at a concentration of 0.1–3 mol/L, preferably 0.5–1.5 mol/L in the organic solvent to use the solution as an electrolytic solution.

A sheet of a polyolefin such as polyethylene or polypropylene, polyester, PVDF, cellulose, or the like, or a glass filter is used as a separator 2.

Other objects, features and advantages of the present invention will be readily appreciated from the preferred embodiments of the present invention, which will be described subsequently in detail with reference to the accompanying drawings.

DETAILED DESCRIPTION OF THE PREFERRED EMBODIMENTS

Preferred embodiments of the active carbon according to the present invention will hereinafter be described in more detail with reference to the accompanying drawings. However, the present invention is not limited to these embodiments.

Figure 1:
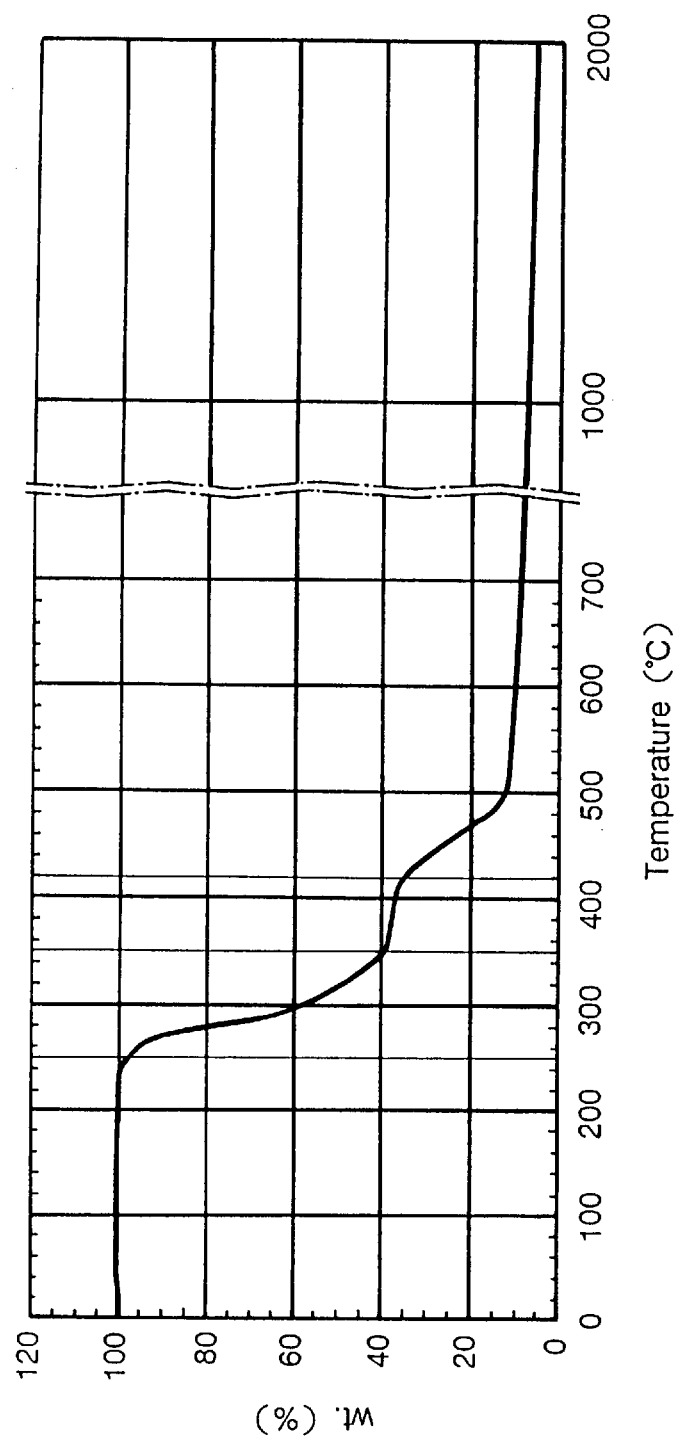
FIG. 1 illustrates a thermogravimetric chart of a vinyl chloride resin.

As illustrated in FIG. 1, the vinyl chloride resin (PVC) exhibits two-stage weight loss of a first-stage weight loss beginning with about 250° C. and ending with about 350° C., and a second-stage weight loss beginning with about 420° C. and ending with about 500° C. when it is gradually heated from room temperature. From the thermogravimetric chart illustrated in FIG. 1, it is considered that when the vinyl chloride resin is calcined, side chains are eliminated from the resin in a temperature range of from about 250° C., at which the first-stage weight loss begins, to about 420° C., at which the second-stage weight loss begins, whereby the carbon skeleton of active carbon is formed, and chlorine is eliminated from the resin in a temperature range of from about 420° C., at which the second-stage weight loss begins, to about 700° C., whereby relatively large pores are formed. It is also considered that hydrogen is eliminated from the resin in a temperature range of from about 700° C. to about 1,000° C., whereby relatively fine pores are formed, carbon is sintered in a temperature range of from about 1,000° C. to about 2,000° C., whereby the pore formed are partially blocked up, and the carbon skeleton is rearranged at a temperature exceeding about 2,000° C., whereby the large and fine pores formed are made closer and finer.

As apparent from FIG. 1, it is considered that the vinyl chloride resin is calcined in a range of about 420°–1,000° C., thereby obtaining a carbonized product having proper pores. Therefore, in this embodiment, the vinyl chloride resin was heated from room temperature to 600° C. and held for 30 minutes at 600° C., thereby calcining the vinyl chloride resin into a carbonized product.

The carbonized product was analyzed at acceleration voltage of 120 kV by means of a transmission electron microscope (CM120, manufactured by Phillips Co.) to obtain an image (photograph) of 200,000 magnifications. An negative image of this photograph was read in a computer by means of a film scanner (LS-4500AF, manufactured by NIKON CORP.) to convert it into a digital image having an image size of 512 pixels×512 pixels at a resolution of 1,200 dpi (pixel/inch) and 256 gradation. A one dimensional power spectrum obtained from the digital image in accordance with the above-described TEM image analysis method is illustrated in FIG. 2.

Figure 2:
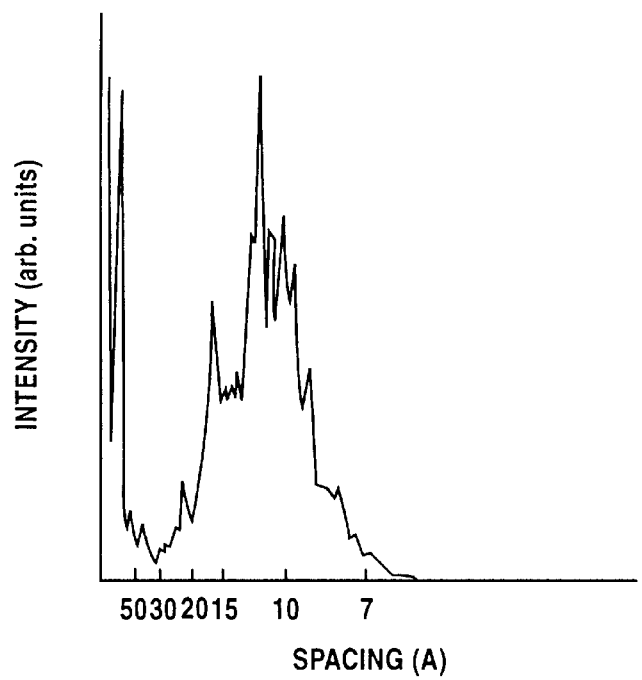
FIG. 2 diagrammatically illustrates a one dimensional power spectrum (which can be regarded as a frequency distribution of pore sizes) of a carbonized product according to the TEM image analysis method.

As described above, the one dimensional power spectrum illustrated in FIG. 2 gives a probability of occurrence of spatial frequency as a function of the spatial frequency and may be regarded as the frequency distribution of pore sizes of the carbonized product. It is apparent from FIG. 2 that the carbonized product has a mode of 12 angstroms and contains pores having a pore size of 12 angstroms in the highest proportion.

The carbonized product thus obtained was then ground into particles having a particle size of 1–100 μm. Potassium hydroxide was mixed in a proportion of 2 parts by weight per 1 part by weight of this carbonized product. The mixture was heated for 3 hours at 800° C. in a nitrogen gas stream to conduct the alkali activation, thereby obtaining active carbon (Example 1). The active carbon thus obtained was analyzed by the same means as that used in the carbonized product to obtain a digital image. The digital image was analyzed according to the above-describe d TEM image analysis method to determine a mode of pore sizes, a relative frequency of the pores having the mode (approximately expressed in terms of a proportion of the number of pores having a pore size of the mode ±2 angstroms to the total number of pores), and an conjunctive pore rate. The results are shown in Table 1.

Figure 4:
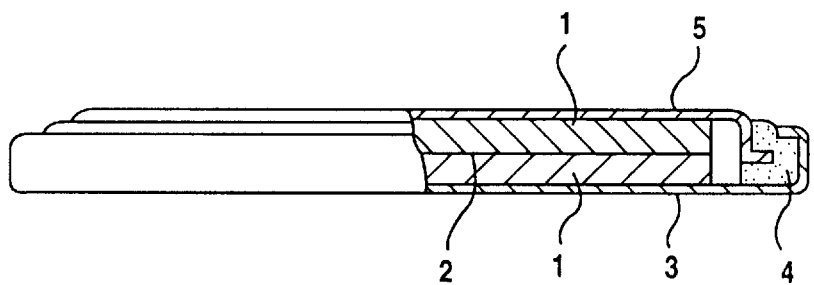
FIG. 4 is an explanatory cross-sectional view, partly broken away, of an illustrative construction of an electric double layer capacitor.

The active carbon thus obtained was used in polarizable electrodes for an electric double layer capacitor to construct an electric double layer capacitor illustrated in FIG. 4. A capacity density per volume of the polarizable electrodes upon charging the electric double layer capacitor up to 4 V was measured. The result is also shown in Table 1.

With respect to active carbon (Example 2) obtained in the same manner as in Example 1 except that the alkali activation was performed by heating the carbonized product at 860° C. for 4 hours, a mode of pore sizes, a relative frequency of the mode, an conjunctive pore rate and a capacity density per volume of polarizable electrodes made from the active carbon upon charging an electric double layer capacitor making use of the polarizable electrodes up to 4 V were measured in the same manner as in Example 1. The results are shown in Table 1.

With respect to active carbon (Example 3) obtained in the same manner as in Example 1 except that the alkali activation was performed by heating the carbonized product at 900° C. for 5 hours, a mode of pore sizes, a relative frequency of the mode, an conjunctive pore rate and a capacity density per volume of polarizable electrodes made from the active carbon upon charging an electric double layer capacitor making use of the polarizable electrodes up to 4 V were measured in the same manner as in Example 1. The results are shown in Table 1.

With respect to active carbon (Comparative Example 1) obtained in the same manner as in Example 1 except that potassium hydroxide was mixed in a proportion of 1 part by weight per 1 part by weight of the carbonized product, and the alkali activation was performed by heating the carbonized product at 750° C. for 4 hours, a mode of pore sizes, a relative frequency of the mode, an conjunctive pore rate and a capacity density per volume of polarizable electrodes made from the active carbon upon charging an electric double layer capacitor making use of the polarizable electrodes up to 4 V were measured in the same manner as in Example 1. The results are shown in Table 1.

With respect to active carbon (Comparative Example 2) obtained in the same manner as in Comparative Example 1 except that the alkali activation was performed by heating the carbonized product at 600° C. for 4 hours, a mode of pore sizes, a relative frequency of the mode, an conjunctive pore rate and a capacity density per volume of polarizable electrodes made from the active carbon upon charging an electric double layer capacitor making use of the polarizable electrodes up to 4 V were measured in the same manner as in Example 1. The results are shown in Table 1.

Figure 3:
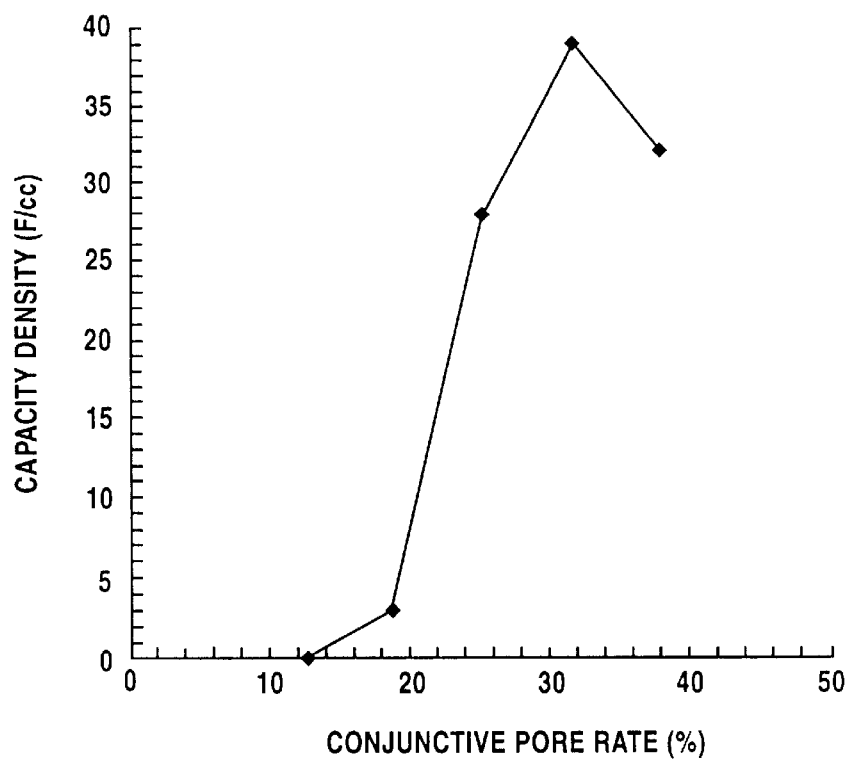
FIG. 3 diagrammatically illustrates the relationship between the conjunctive pore rate of active carbon and the capacity density per volume of a polarizable electrode making use of the active carbon.

Further, the relationship between the conjunctive pore rate and the capacity density per volume of the polarizable electrode is illustrated in FIG. 3.

TABLE 1

| | Mode (Å) | Relative frequency (%) | Conjunctive pore rate (%) | Capacity (F/cc) |
|---|---|---|---|---|
| Example 1 | 12.6 | 56.3 | 22.2 | 28 |
| Example 2 | 12.8 | 60.4 | 26.8 | 39 |
| Example 3 | 12.7 | 43.0 | 38.5 | 32 |
| Comp. Ex. 1 | 12.5 | 38.5 | 18.7 | 3 |
| Comp. Ex. 2 | 12.3 | 31.4 | 12.6 | 0 |

As apparent from Table 1 and FIG. 3, in each example according to the present invention, a difference between the mode of the carbonized product as a raw material and the mode of the active carbon obtained by activating the carbonized product with the alkali is within a range of 0.6–0.8 angstroms and falls within the range of 0.2–3 angstroms recited in the present invention. As a result, it is apparent that the mode of pore sizes of the active carbon is within a range of 12.6–12.8 angstroms, and the relative frequency of the mode is within a range of 43–60.4%, so that a large number of pores having a pore size of the mode are formed in the active carbon.

It is also apparent that the active carbon in each example according to the present invention has an conjunctive pore rate of at least 20%, and the polarizable electrodes made from the active carbon are excellent in capacity density per volume compared with the polarizable electrodes made from the active carbon of each comparative example, the conjunctive pore rate of which is lower than 20%.

It is further apparent from FIG. 3 that the capacity density per volume of the polarizable electrode is divided into low and high values by the conjunctive pore rate of 20%.

What is claimed is:

1. An active carbon suitable for use in electrodes for an organic solvent type electric double layer capacitor, which is obtained by calcining an easily graphitizable organic substance to produce a carbonized product and then activating the carbonized product with an alkali, wherein the active carbon has pores having a pore size distribution wherein a mode in the pore size distribution according to a transmission electron microscope (TEM) image analysis method falls within a range of 10–20 angstroms, and a conjunctive pore rate, which is expressed by a proportion of a total area of pores having an area not smaller than 500 square angstroms to a whole pore area in the TEM image, is at least 20%.

2. The active carbon according to claim 1, wherein the mode in the pore size distribution falls within a range of 11–15 angstroms.

3. The active carbon according to claim 1, wherein at least 40% of the pores have a pore size which is within the range of 10–20 angstroms.

4. The active carbon according to claim 1, wherein a difference between a mode in the pore size distribution of the carbonized product according to the TEM image analysis method and a mode in a pore size distribution of the active carbon obtained by activating the carbonized product with an alkali according to the TEM image analysis method is within a range of 0.2–3 angstroms.

5. The active carbon according to claim 1, wherein the alkali activation is performed for 0–20 hours at a temperature ranging from 500° to 1,000° C.

6. The active carbon according to claim 1, wherein the alkali activation is performed with a monovalent base of an alkali metal hydroxide as an activator.

7. The active carbon according to claim 1, wherein the alkali activation is performed by using the alkali metal hydroxide in a range from more than 1 part by weight to not more than 4 parts by weight per 1 part by weight of the carbonized product.

8. The active carbon according to claim 1, wherein the carbonized product is ground into particles having a particle size ranging from 0.1 to 300 $\mu$m before the alkali activation.

9. The active carbon according to claim 1, wherein the easily graphitizable organic substance is a vinyl chloride resin.

* * * * *